US011514195B2

(12) United States Patent
Kennedy

(10) Patent No.: US 11,514,195 B2
(45) Date of Patent: Nov. 29, 2022

(54) ADAPTIVE DIRECT-ATTACHED HOTPLUG DETECTION

(71) Applicant: Dell Products L.P., Round Rock, TX (US)

(72) Inventor: Jeffrey L. Kennedy, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 222 days.

(21) Appl. No.: 17/117,379

(22) Filed: Dec. 10, 2020

(65) Prior Publication Data
US 2022/0188469 A1  Jun. 16, 2022

(51) Int. Cl.
*G06F 21/85* (2013.01)
*G06F 13/38* (2006.01)
*G06F 13/42* (2006.01)

(52) U.S. Cl.
CPC ............ *G06F 21/85* (2013.01); *G06F 13/385* (2013.01); *G06F 13/4282* (2013.01); *G09G 2370/047* (2013.01)

(58) Field of Classification Search
CPC ....................................................... G02B 6/43
See application file for complete search history.

(56) References Cited

U.S. PATENT DOCUMENTS

2003/0023800 A1\* 1/2003 Knaack ............... G06F 13/4004
710/300

\* cited by examiner

*Primary Examiner* — Henry Tsai
*Assistant Examiner* — Juanito C Borromeo
(74) *Attorney, Agent, or Firm* — Jackson Walker L.L.P.

(57) ABSTRACT

A method may include, in an information handling system having a backplane comprising a plurality of connectors, each connector configured to receive an input/output device, and a motherboard communicatively coupled to the backplane via a cable having a presence detection wire configured to transmit presence detection information associated with the plurality of connectors and further having a plurality of data transmission wires: during a discrete mode, monitoring for an indicator from the backplane via the presence detection wire to determine if the backplane is configured for communication of serial presence detection information regarding the plurality of connectors and enter a serial mode in response to receiving the indicator; during the serial mode, receiving via the presence detection wire serialized frames including serialized presence detection information regarding input/output devices received in the plurality of connectors; and deserializing the serialized presence detection information and communicating deserialized presence detection information to a host controller configured to communicate with input/output devices received in the plurality of connectors via the plurality of data transmission wires.

21 Claims, 4 Drawing Sheets

ADAPTIVE DIRECT-ATTACHED HOTPLUG DETECTION

TECHNICAL FIELD

The present disclosure relates in general to information handling systems, and more particularly to methods and systems for detecting support for serialized presence detection of input/output devices on the same electrical conductor that supports parallel discrete presence detection in an information handling system.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Solid state drives, such as Non-Volatile Memory Enhanced (NVMe) devices, may be coupled to an input/output (I/O) backplane which may in turn be coupled to a motherboard via a Peripheral Component Interconnect Enhanced (PCIe) cable. Such cables may include support for eight PCIe lanes and two parallel wires for presence detection of devices coupled to the backplane. However, the industry is moving towards architectures in which many (e.g., from eight to 48) NVMe devices may be coupled to a backplane. As a result of the number of devices on a backplane largely outnumbering the number of supported presence detection wires, and because of a lack of scalability of presence detection wires, such architectures may not be feasible using existing approaches.

SUMMARY

In accordance with the teachings of the present disclosure, the disadvantages and problems associated with existing approaches to presence detection of multiple devices may be reduced or eliminated.

In accordance with embodiments of the present disclosure, an information handling system may include a backplane comprising a plurality of connectors, each connector configured to receive an input/output device, and a motherboard communicatively coupled to the backplane via a cable having a presence detection wire configured to transmit presence detection information associated with the plurality of connectors and further having a plurality of data transmission wires. The motherboard may include a host controller configured to communicate with input/output devices received in the plurality of connectors via the plurality of data transmission wires and a logic device communicatively coupled to the host controller and configured to communicate with the backplane via the presence detection wire. The host controller may be further configured to, during a discrete mode, monitor for an indicator from the backplane via the presence detection wire to determine if the backplane is configured for communication of serial presence detection information regarding the plurality of connectors and enter a serial mode in response to receiving the indicator. The host controller may also be configured to, during the serial mode, receive via the presence detection wire serialized frames including serialized presence detection information regarding input/output devices received in the plurality of connectors. The host controller may additionally be configured to deserialize the serialized presence detection information and communicate deserialized presence detection information to the host controller.

In accordance with embodiments of the present disclosure, a method may include, in an information handling system having a backplane comprising a plurality of connectors, each connector configured to receive an input/output device, and a motherboard communicatively coupled to the backplane via a cable having a presence detection wire configured to transmit presence detection information associated with the plurality of connectors and further having a plurality of data transmission wires: during a discrete mode, monitoring for an indicator from the backplane via the presence detection wire to determine if the backplane is configured for communication of serial presence detection information regarding the plurality of connectors and enter a serial mode in response to receiving the indicator; during the serial mode, receiving via the presence detection wire serialized frames including serialized presence detection information regarding input/output devices received in the plurality of connectors; and deserializing the serialized presence detection information and communicating deserialized presence detection information to a host controller configured to communicate with input/output devices received in the plurality of connectors via the plurality of data transmission wires.

In accordance with these and other embodiments of the present disclosure, an article of manufacture may include a non-transitory computer-readable medium and computer-executable instructions carried on the computer-readable medium, the instructions readable by a processing device, the instructions, when read and executed, for causing the processing device to, in an information handling system having a backplane comprising a plurality of connectors, each connector configured to receive an input/output device, and a motherboard communicatively coupled to the backplane via a cable having a presence detection wire configured to transmit presence detection information associated with the plurality of connectors and further having a plurality of data transmission wires: during a discrete mode, monitor for an indicator from the backplane via the presence detection wire to determine if the backplane is configured for communication of serial presence detection information regarding the plurality of connectors and enter a serial mode in response to receiving the indicator; during the serial mode, receive via the presence detection wire serialized frames including serialized presence detection information regarding input/output devices received in the plurality of connectors; and deserialize the serialized presence detection information and communicate deserialized presence detection information to a host controller configured to communicate with input/output devices received in the plurality of connectors via the plurality of data transmission wires.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Preferred embodiments and their advantages are best understood by reference to FIGS. 1 through 4 wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems, buses, memories, I/O devices and/or interfaces, storage resources, network interfaces, motherboards, and/or any other components and/or elements of an information handling system.

Figure 1:
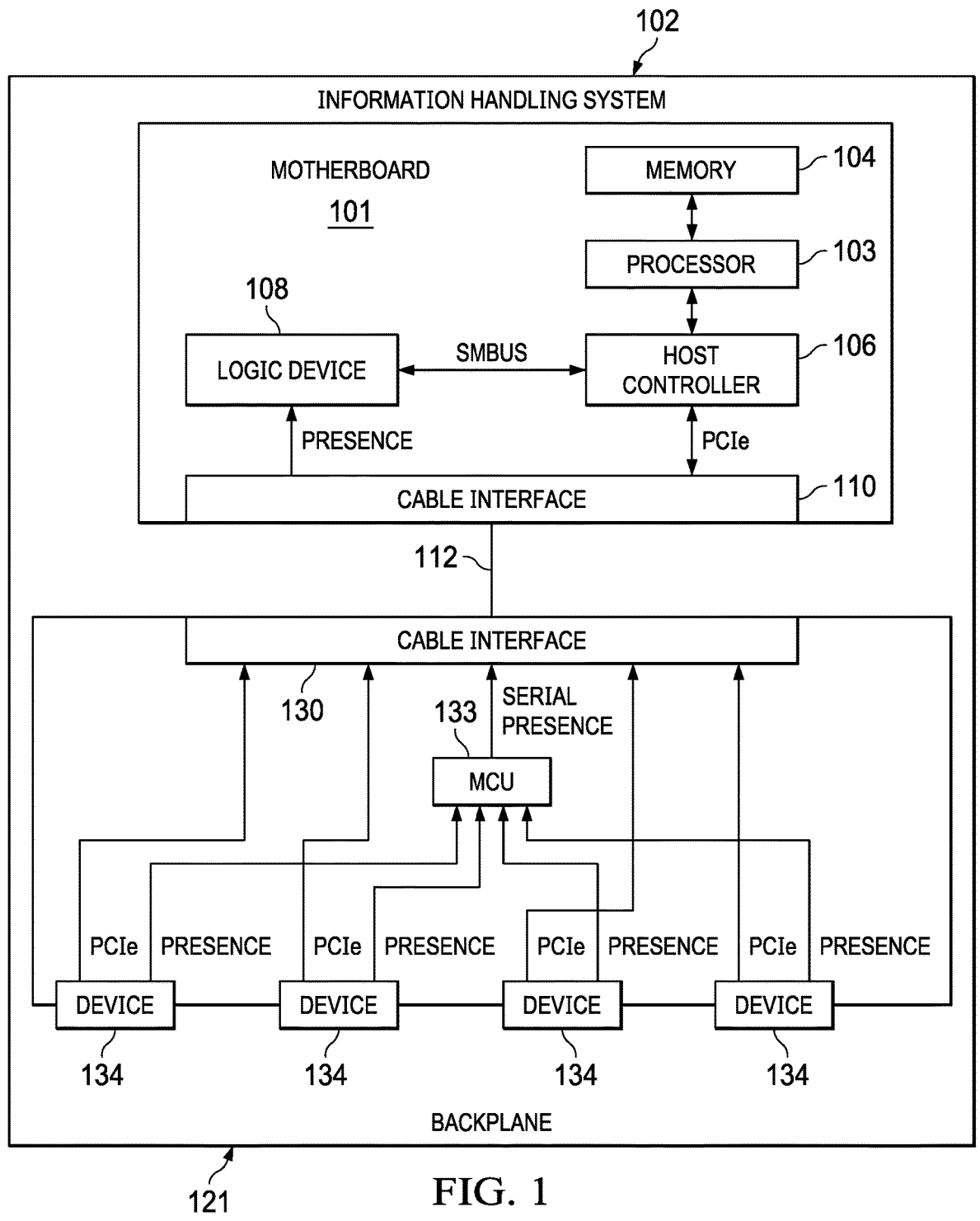
FIG. 1 illustrates a block diagram of an example information handling system, in accordance with embodiments of the present disclosure.

FIG. 1 illustrates a block diagram of an example information handling system 102, in accordance with embodiments of the present disclosure. In some embodiments, information handling system 102 may comprise or be an integral part of a server. In other embodiments, information handling system 102 may be a personal computer. In these and other embodiments, information handling system 102 may be a portable information handling system (e.g., a laptop, notebook, tablet, handheld, smart phone, personal digital assistant, etc.). As depicted in FIG. 1, information handling system 102 may include a motherboard 101, and a backplane 121 communicatively coupled to motherboard 101 via a cable 112.

Motherboard 101 may include a circuit board configured to provide structural support for one or more information handling resources of information handling system 102 and/or electrically couple one or more of such information handling resources to each other and/or to other electric or electronic components external to information handling system 102. As shown in FIG. 1, motherboard 101 may include processor 103, a memory 104 communicatively coupled to processor 103, a host controller 106 communicatively coupled to processor 103, a logic device 108 communicatively coupled to host controller 106, and a cable interface 110 communicatively coupled to host controller 106 and logic device 108.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off. Although memory 104 is depicted in FIG. 1 as integral to motherboard 101, in some embodiments, all or a portion of memory 104 may reside external to motherboard 101.

Host controller 106 may be any system, device, or apparatus configured to control certain data paths (e.g., data flow between processor 103, memory 104, and peripherals) and support certain functions of processor 103. Host controller 106 may also be known as a "chipset" or "platform controller hub" of information handling system 102. One such function of host controller 106 may include remote out-of-band management for information handling system 102 in order to monitor, maintain, update, upgrade, and/or repair information handling system 102. In some embodiments, such hardware and firmware may be compliant with Intel's Active Management Technology.

Logic device 108 may comprise any system, device, or apparatus configured to, as described in greater detail below, receive serialized presence detection information from backplane 121 and deserialize the serialized presence detection information to present parallel presence detection information to host controller 106 via a System Management Bus (SMBus) or other suitable communications topology.

Cable interface 110 may comprise any system, device, or apparatus configured to communicate data between host controller 106 and cable 112 (e.g., via PCIe) and communicate serial presence detection information from cable 112 to logic device 108. Accordingly, cable interface 110 may include a suitable connector or receptacle for receiving cable 112.

Cable 112 may comprise a plurality of electrically-isolated wires and may be terminated at each end with connectors or other terminations configured to electrically and mechanically couple to cable interface 110 and cable interface 130. In some embodiments, cable 112 may comprise a PCI cable having a plurality of parallel data lines (e.g., 8) and one or more presence detection wires.

Backplane 121 may comprise any system, device, or apparatus (e.g., a printed circuit board) configured to provide power and/or signals (e.g., data and sideband signals) to each of one of more devices 134 received at corresponding connectors (e.g., receptacle connectors) of backplane 121, such connectors configured to mechanically and electrically couple devices 134 to electrically conductive pathways of backplane 121. As shown in FIG. 1, backplane 121 may include a cable interface 130 and a microcontroller unit (MCU) 133.

Cable interface 130 may comprise any system, device, or apparatus configured to communicate data between devices 134 and cable 112 (e.g., via PCIe) and communicate serial presence detection information from MCU 133 to cable 112. Accordingly, cable interface 130 may include a suitable connector or receptacle for receiving cable 112.

MCU 133 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. As described in greater detail below, MCU 133 may comprise a special-purpose control unit configured to receive presence detection information from devices 134 and serialize such information to generate serial presence detection information and communicate such serial presence detection information to logic device 108 via cable 112.

Each device 134 may comprise any suitable input/output device configured to communicate with processor 103, and may in some embodiments comprise one or more storage resources for storing data. For example, in some embodiments, devices 134 may comprise an NVMe storage device or other solid state drive. For purposes of exposition, four devices 134 are shown populated in backplane 121. However, backplane 121 may include any suitable number of connectors for receiving devices 134, and at any time, none, some, or all of such connectors may be populated with corresponding devices 134.

Figure 2:
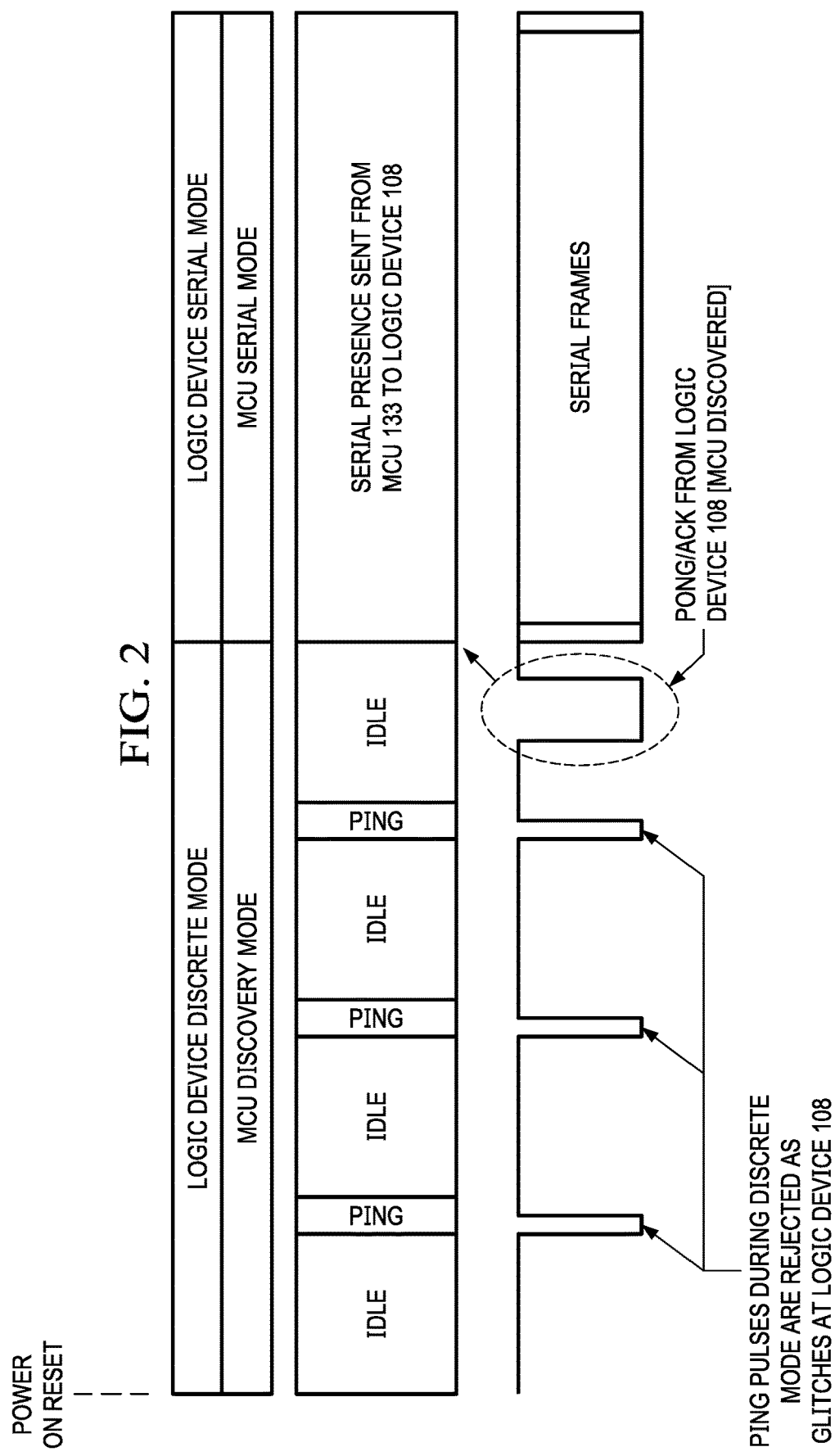
FIG. 2 illustrates contents of example traffic communicated on a presence detect wire of a cable by a microcontroller unit of a backplane and a logic device of a motherboard, in accordance with embodiments of the present disclosure.

FIG. 2 illustrates contents of example traffic communicated on a presence detect wire of cable 112 by MCU 133 and logic device 108, in accordance with embodiments of the present disclosure. As shown in FIG. 2, upon a power-on reset of information handling system 102, MCU 133 may begin in a discovery mode in which it communicates periodic ping pulses to logic device 108 on a discrete presence detection wire of cable 112, such pulses indicating to logic device 108 a presence of MCU 133 and the ability of MCU 133 to communicate serialized presence detection information. While MCU 133 is in discovery mode, logic device 108 may operate in a discrete mode and receive such pulses from MCU 133. Such pulses may be filtered as glitches by logic device 108 such that they are not further propagated to host controller 106, but may be processed by logic device 108, in response to which logic device 108 may communicate an acknowledgement signal ACK to MCU 133 on the discrete presence detection wire of cable 112 acknowledging to MCU 133 that logic device 108 has recognized the ability of MCU 133 to communicate serialized presence detection information.

Upon receipt of the acknowledgement signal ACK by MCU 133, MCU 133 may enter a serial mode, and logic device 108 may also enter a corresponding serial mode. During such serial mode, MCU 133 may communicate serial frames to logic device 108 on the discrete presence detection wire of cable 112, such serial frames including serialized presence detection information regarding devices 134 present within backplane 121, for example as shown in FIG. 3.

Figure 3:
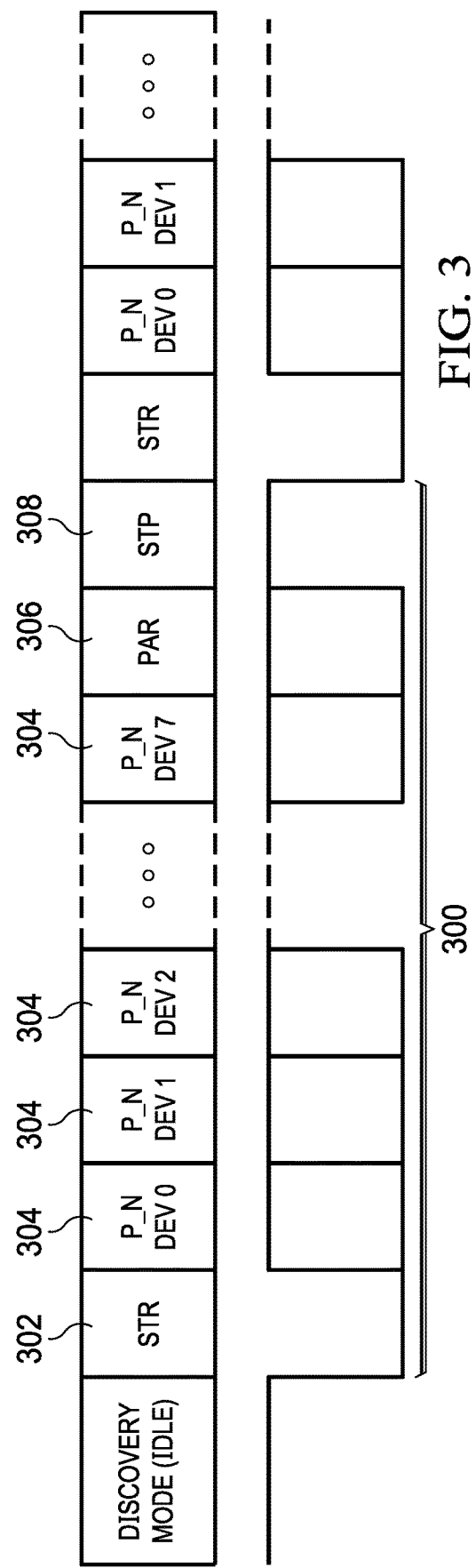
FIG. 3 illustrates an example serialized frame including serialized presence detection information regarding devices present within a backplane, in accordance with embodiments of the present disclosure.

FIG. 3 illustrates an example serialized frame 300 including serialized presence detection information regarding devices 134 present within backplane 121, in accordance with embodiments of the present disclosure. Serialized frame 300 may begin with a start (STR) bit 302, which may be asserted low as shown in FIG. 3. Start bit 302 may be followed with a plurality of device presence bits 304, one device presence bit 304 for each connector of backplane 121 configured to receive a device 134. For example, a device presence bit 304 may be asserted low to indicate presence of a device 134 in a particular connector of backplane 121, while a device presence bit 304 may be asserted high to indicate absence of a device 134 within a particular connector of backplane 121 (such assertion to high may indicate "not applicable," such as the non-existence of such connector on backplane 121). Device presence bits 304 may be followed by a parity checking bit 306 and a stop (STP) bit 308 (e.g., asserted high). Any parity of framing error detected by logic device 108 may lead to discarding of the serialized frame 300 by logic device 108. Also, as suggested in FIG. 3, each serialized frame 300 may be followed by another serialized frame 300, such that successive serialized frames may update presence detection information of devices 134 over time.

Figure 4:
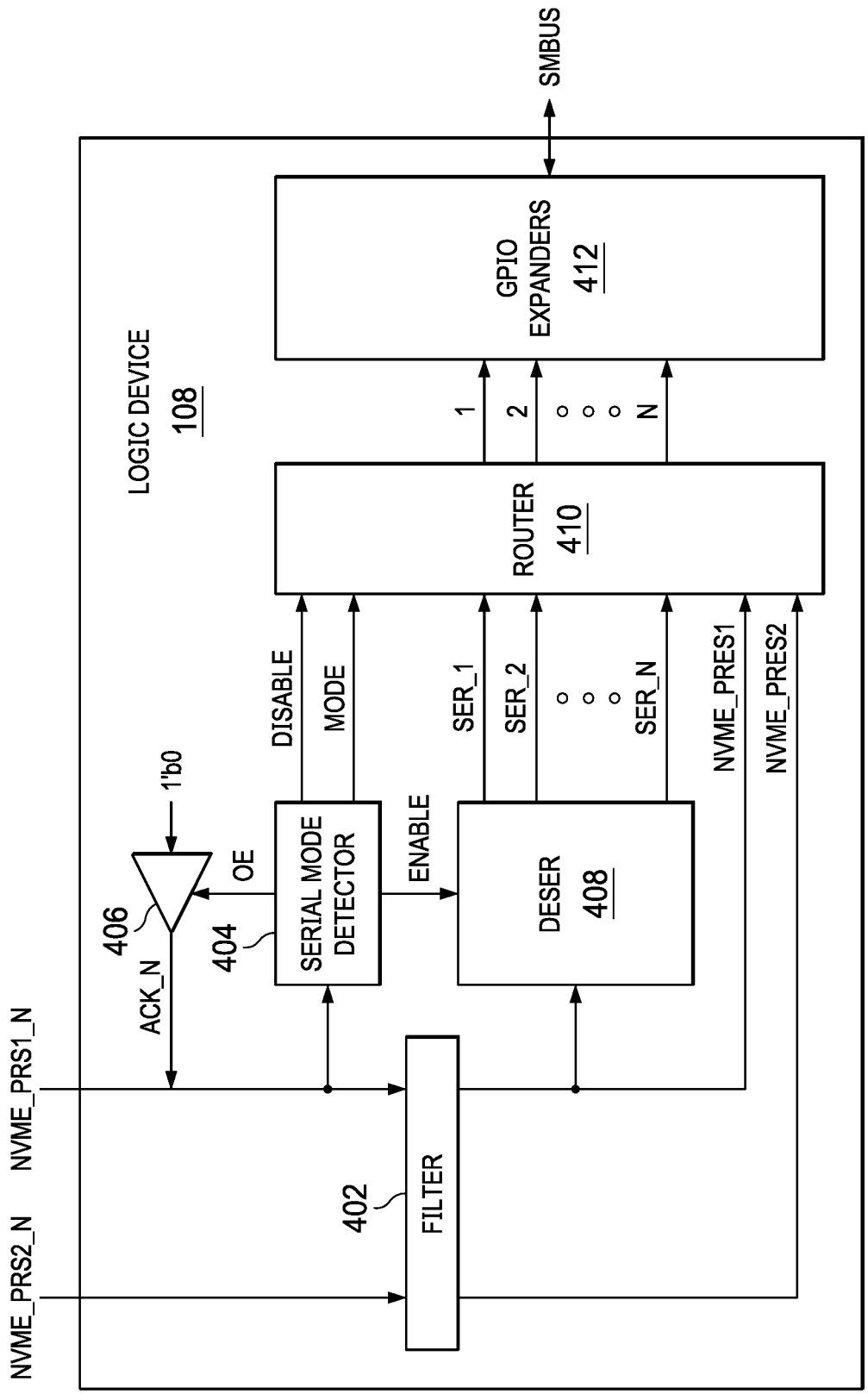
FIG. 4 illustrates a block diagram of a logic device, in accordance with embodiments of the present disclosure.

FIG. 4 illustrates a block diagram of logic device 108, in accordance with embodiments of the present disclosure. As shown in FIG. 4, logic device 108 may receive presence detection signals NVME_PRS1_N and NVME_PRS2_N. When in the discrete mode, presence detection signals NVME_PRS1_N and NVME_PRS2_N may include parallel presence detection information, and when in the serial mode, one of such signals (e.g., NVME_PRS1_N) may include serial presence detection information, as described above.

As also shown in FIG. 4, logic device 108 may include a filter 402. Filter 402 may include any suitable filter (e.g., a low-pass filter) configured to filter out short pulses (e.g., the ping pulses shown in FIG. 2) on presence detection signals NVME_PRS1_N and NVME_PRS2_N to prevent propagation of such pulses to deserializer 408 and router 410.

When operating in the discrete mode, a serial mode detector 404 may determine whether ping pulses (e.g., indicating a presence of MCU 133 and the ability of MCU 133 to communicate serialized presence detection information) are received on a presence detection wire. In response to receipt of the ping pulses, serial mode detector 404 may assert an output enable signal OE, causing a buffer 406 to assert acknowledge signal ACK_N and drive acknowledge signal ACK_N to MCU 133 on a presence detection wire (e.g., NVME_PRS1_N) to acknowledge the ability of MCU 133 to communicate serialized presence detection information. When asserting output enable signal OE, serial mode detector 404 may also assert and communicate to router 410 a disable signal DISABLE to prevent acknowledge signal ACK_N from being processed by router 410 as presence detection information. As shown in FIG. 4, serial mode detector 404 may also communicate a mode signal MODE to router 410 indicative of whether logic device 108 is in the discrete mode or the serial mode, allowing router 410 to properly process signals it receives based on mode. As further shown in FIG. 4, serial mode detector 404 may also communicate an enable signal ENABLE to deserializer 408 to enable operation of deserializer 408 when logic device 108 is in the serial mode.

When logic device 108 is in the serial mode, deserializer 408 may be configured to receive serialized frames 300, and deserialize serialized frames 300 to communicate to router 410 presence detection signals (e.g., SER_1, SER_2, ... SER_N) for each device connector of backplane 121. Based on the mode of logic device 108, the deserialized presence detection signals (e.g., SER_1, SER_2, ..., SER_N), and presence detection signals NVME_PRS1_N and NVME_PRS2_N, router 410 may communicate to general purpose input/output (GPIO) expanders 412 a presence detection signal (e.g., 1, 2, ..., N) for each device connector of backplane 121. In turn, GPIO expanders 412 may communicate presence detection information to host controller 106.

In accordance with this disclosure, the systems and methods described herein may enable dynamic detection of parallel discrete or serialized signaling on a single conductor. Further, the systems and methods described herein may provide a discovery mode which is transparent to a SMBus/GPIO expander network accessible by host controller 106. In addition, the systems and methods described herein may provide an ability to discard and/or collapse discrete signal paths which are not utilized. Moreover, the systems and methods described herein may enable bit and framing error protection for serialized presence detection.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described above, the principles of the present disclosure may be implemented using any number of techniques, whether currently known or not. The present disclosure should in no way be limited to the exemplary implementations and techniques illustrated in the figures and described above.

Unless otherwise specifically noted, articles depicted in the figures are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

What is claimed is:

1. An information handling system comprising:
   a backplane comprising a plurality of connectors, each connector configured to receive an input/output device;
   a motherboard communicatively coupled to the backplane via a cable having a presence detection wire configured to transmit presence detection information associated with the plurality of connectors and further having a plurality of data transmission wires, the motherboard comprising:
   a host controller configured to communicate with input/output devices received in the plurality of connectors via the plurality of data transmission wires; and a logic device communicatively coupled to the host controller and configured to communicate with the backplane via the presence detection wire and further configured to:
  during a discrete mode, monitor for an indicator from the backplane via the presence detection wire to determine if the backplane is configured for communication of serial presence detection information regarding the plurality of connectors and enter a serial mode in response to receiving the indicator;
  during the serial mode, receive via the presence detection wire serialized frames including serialized presence detection information regarding input/output devices received in the plurality of connectors; and
  deserialize the serialized presence detection information and communicate deserialized presence detection information to the host controller.

2. The information handling system of claim 1, wherein the input/output devices comprise solid state storage devices.

3. The information handling system of claim 1, wherein the input/output devices comprise Non-Volatile Memory Express storage devices.

4. The information handling system of claim 1, wherein the plurality of data transmission wires is configured to communicate data in accordance with Peripheral Component Interconnect Express.

5. The information handling system of claim 1, wherein the presence detection wire is one of a plurality of presence detection wires integral to the cable, the plurality of presence detection wires configured to transmit presence detection information in parallel in the discrete mode.

6. The information handling system of claim 1, wherein each of the serialized frames comprises error checking information and the logic device is further configured to examine the error checking information to determine the presence of an error in each of the serialized frames.

7. The information handling system of claim 6, wherein the error checking information comprises a parity bit.

8. A method comprising, in an information handling system having a backplane comprising a plurality of connectors, each connector configured to receive an input/output device, and a motherboard communicatively coupled to the backplane via a cable having a presence detection wire configured to transmit presence detection information associated with the plurality of connectors and further having a plurality of data transmission wires:
  during a discrete mode, monitoring for an indicator from the backplane via the presence detection wire to determine if the backplane is configured for communication of serial presence detection information regarding the plurality of connectors and enter a serial mode in response to receiving the indicator;
  during the serial mode, receiving via the presence detection wire serialized frames including serialized presence detection information regarding input/output devices received in the plurality of connectors; and
  deserializing the serialized presence detection information and communicating deserialized presence detection information to a host controller configured to communicate with input/output devices received in the plurality of connectors via the plurality of data transmission wires.

9. The method of claim 8, wherein the input/output devices comprise solid state storage devices.

10. The method of claim 8, wherein the input/output devices comprise Non-Volatile Memory Express storage devices.

11. The method of claim 8, wherein the plurality of data transmission wires is configured to communicate data in accordance with Peripheral Component Interconnect Express.

12. The method of claim 8, wherein the presence detection wire is one of a plurality of presence detection wires integral to the cable, the plurality of presence detection wires configured to transmit presence detection information in parallel in the discrete mode.

13. The method of claim 8, wherein each of the serialized frames comprises error checking information and the logic device is further configured to examine the error checking information to determine the presence of an error in each of the serialized frames.

14. The method of claim 13, wherein the error checking information comprises a parity bit.

15. An article of manufacture comprising:
  a non-transitory computer-readable medium; and
  computer-executable instructions carried on the computer-readable medium, the instructions readable by a processing device, the instructions, when read and executed, for causing the processing device to, in an information handling system having a backplane comprising a plurality of connectors, each connector configured to receive an input/output device, and a motherboard communicatively coupled to the backplane via a cable having a presence detection wire configured to transmit presence detection information associated with the plurality of connectors and further having a plurality of data transmission wires:
    during a discrete mode, monitor for an indicator from the backplane via the presence detection wire to determine if the backplane is configured for communication of serial presence detection information regarding the plurality of connectors and enter a serial mode in response to receiving the indicator;
    during the serial mode, receive via the presence detection wire serialized frames including serialized presence detection information regarding input/output devices received in the plurality of connectors; and
    deserialize the serialized presence detection information and communicate deserialized presence detection information to a host controller configured to communicate with input/output devices received in the plurality of connectors via the plurality of data transmission wires.

16. The article of claim 15, wherein the input/output devices comprise solid state storage devices.

17. The article of claim 15, wherein the input/output devices comprise Non-Volatile Memory Express storage devices.

18. The article of claim 15, wherein the plurality of data transmission wires is configured to communicate data in accordance with Peripheral Component Interconnect Express.

19. The article of claim 15, wherein the presence detection wire is one of a plurality of presence detection wires integral to the cable, the plurality of presence detection wires configured to transmit presence detection information in parallel in the discrete mode.

20. The article of claim 15, wherein each of the serialized frames comprises error checking information and the logic device is further configured to examine the error checking information to determine the presence of an error in each of the serialized frames.

21. The article of claim 20, wherein the error checking information comprises a parity bit.

\* \* \* \* \*